(12) United States Patent  
Kaplan

(10) Patent No.: US 7,646,944 B2
(45) Date of Patent: Jan. 12, 2010

(54) OPTICAL SENSOR WITH DISTRIBUTED SENSITIVITY

(75) Inventor: Arkady Kaplan, Rockville, MD (US)

(73) Assignee: CeLight, Inc., Silver Spring, MD (US)

( * ) Notice: Subject to any disclaimer, the term of this patent is extended or adjusted under 35 U.S.C. 154(b) by 0 days.

(21) Appl. No.: 12/466,128

(22) Filed: May 14, 2009

(65) Prior Publication Data

US 2009/0285520 A1 Nov. 19, 2009

Related U.S. Application Data

(60) Provisional application No. 61/053,789, filed on May 16, 2008.

(51) Int. Cl.
*G02B 6/00* (2006.01)
*G08B 13/00* (2006.01)

(52) U.S. Cl. .......................... 385/12; 385/13; 385/100; 385/42; 340/541; 340/550; 340/555; 340/556; 340/557

(58) Field of Classification Search ................... 385/12, 385/13, 100, 42, 14, 39, 40, 115, 116; 340/541, 340/550, 555, 556, 557
See application file for complete search history.

(56) References Cited

U.S. PATENT DOCUMENTS

| | | | | |
|---|---|---|---|---|
| 5,118,931 A | * | 6/1992 | Udd et al. ............... | 250/227.16 |
| 5,434,557 A | * | 7/1995 | Alizi .......................... | 340/555 |
| 6,647,161 B1 | * | 11/2003 | Hodge ........................ | 385/12 |
| 7,110,625 B2 | * | 9/2006 | Chun .......................... | 385/12 |
| 7,532,781 B2 | * | 5/2009 | Thompson et al. ........... | 385/13 |
| 2003/0127587 A1 | * | 7/2003 | Udd et al. .............. | 250/227.14 |
| 2004/0099801 A1 | * | 5/2004 | Schulz et al. ........... | 250/227.14 |
| 2006/0083458 A1 | * | 4/2006 | Iffergan ...................... | 385/13 |

* cited by examiner

Primary Examiner—Brian M Healy
(74) Attorney, Agent, or Firm—Nadya Reingand

(57) ABSTRACT

A system and method for a structure monitoring and locating a disturbance event is disclosed. The system includes a compact transceiver chip sending optical signals in three optical fibers that encompass the monitored structure appropriately. The fiber arrangement has different density in different parts of the monitored structure, such as, for example, critical places in the structure may have larger number of fiber loops surrounding them. All fibers transmit signals in both directions: from the transceiver to a returning point and back. A set of two detectors registers the returning signals, and a time delay between those signals is calculated, which is indicative of the disturbance event location. Polarization states of the returning signals are controlled by transceiver built-in controllers. The event location is determined with different sensitivity in different parts of the monitored structure depending on the density of fibers in these parts.

20 Claims, 7 Drawing Sheets

OPTICAL SENSOR WITH DISTRIBUTED SENSITIVITY

CROSS-REFERENCE TO RELATED APPLICATIONS

This application claims priority to U.S. provisional application Ser. No. 61/053,789 filed May 16, 2008.

FIELD OF INVENTION

The invention is related to systems that provide information for detecting and localizing events. In particular the invention relates to optical fences with a distributed fiber interferometer sensor to determine the location of a disturbance event along the object of interest and/or extensive perimeter area under observation.

BACKGROUND OF THE INVENTION

Fiber optic distributed sensing overcomes the inherent limitations of traditional technologies, such as motion detectors, cameras, thermocouples and strain gauges, enabling monitoring solutions with new advantages for the protection of people and critical assets, especially when monitoring in inaccessible or inhospitable environments.

In a distributed sensor, the whole optical cable is the sensor itself. Typically, the fiber is integrated around (or into) a valuable asset (building, pipeline, cables, etc.). A single optical fiber can replace thousands of traditional single-point sensors, providing a significant reduction in installation, calibration, and maintenance costs. In addition, assets can now be monitored where previously this was impractical due to their size, complexity, location or environment.

The monitored structure in the present invention is any object or area under observation. The monitored structure can be the area enclosed into the sensor system completely or partially. The monitored structure can be an object, such as pipe, cable, fence, wall, etc. that is integrated into the system by placing the optical fibers in a proximity to the object or integrated into the object, for example installed into, wrapped by or winded around the object. A single monitored structure can be comprised of different elements that are objects of, generally, different types, for example, monitored areas and monitored objects at the same time.

The inherent distributed sensing nature of fiber optic sensors can be used to create unique forms of sensors for which, in general, there may be no counterpart based on conventional sensor technologies. Optical fiber is cheap, light, pliable, and immune to electromagnetic interference (EMI), which makes it a cost-effective, flexible and an inert sensor medium.

Most of the existing distributed sensors are based on Distributed Scattering Sensing (Raman or Brillion), which has a limited sensitivity and immunity to various noises.

With modern low loss fibers and solid state laser diode sources, it has become possible to develop systems having sensing fibers up to several tens of kilometers in length. In one field of application, these fibers can, for example, be placed under ground, carpets, imbedded in walls, under roads, or under turf. In such installations the sensors can be effective in the detection of personnel, vehicles, animals, etc. into a protected area of interest.

There is a need in well concealed fiber optic sensing systems to provide economic means for location of events, recognition and identification of disturbance events, and positive means for periodically and remotely proof testing the integrity of the sensing fiber.

A few distributed optical fiber sensing systems based on a Sagnac interferometer and a Mach-Zehnder interferometers have been previously developed. These systems depend on the interferometric detection of phase differences between two optical signals whose relative phases have been shifted by changes in the optical properties of their respective paths caused by an external factor, such as, for example, acoustical or mechanical perturbation. The change in optical property of the fiber path may be in the form of elongation, change in index of refraction, change in birefringence, or a combination of these or related effects.

While interferometer-based sensor systems have been developed with a number of refinements, such systems have not been fully optimized for use in applications that require simultaneous monitoring of different types of objects.

Prior art, for example, U.S. Pat. No. 6,621,947 and No. 6,778,717, both by E. E. Tapanes et al., discloses a principle (device and method) behind the counter-propagating signals detection in distributed fiber sensor. Optical signals are launched from a single light source into the waveguide (fence) and simultaneously detected by a two separate photodetectors. The difference between registered signals allows detecting the place of the optical fence intrusion. Any parameter that alters the fiber will affect both counter-propagating signals in a similar fashion. Thus, the U.S. Pat. No. 7,519,242 by E. E. Tapanes shows the particular buried fiber configuration that is specifically suited for detecting an intruder walking across the ground beneath which fibers are burried.

However, it is desirable to have a distributed sensing system where the response to the potential perturbation can vary along the cable, being adjusted to either the real system environment or a particular system application. In other words, the real system implementation might require different sensitivity at different areas being monitored, depending on, for example, different structure layouts, various perturbation probabilities within different areas, or the different nature of perturbations within different areas. The prior art does not provide such desirable functionality.

Polarization phase shift variations are caused by dynamically varying changes in a signals polarization state versus the principal polarization axis of the interferometer. As a result, received counter-propagating signals can potentially interfere constructively or destructively. Thus, it is also desirable, in addition, to have a distributed sensing system where polarization effects are intrinsically managed by the system to dynamically address the variation of polarization states along the fiber sensor. Polarization management techniques for distributed fiber sensing have been disclosed in U.S. Pat. No. 7,499,176 by A. R. Adams and U.S. Pat. No. 7,499,177 by J. Katsifolis, as well as in U.S. Pat. No. 7,142,736 by J. S. Patel et al. Moreover, the U.S. Pat. No. 7,139,476 discloses the method of disturbance event detection/location by using the changes in the states of polarization of counter propagating signals themselves. However, in all these configurations, the external polarization management was applied to the system with uniform perturbation response across the perimeter, as mentioned above.

There is a need for a distributed fiber sensing link with non-uniform perturbation response across the perimeter, which would drastically expand the applicability of the system.

Although existing security application of distributed sensor systems are valuable in detecting events over large areas, they are not always sufficiently sensitive, capable of dynamic adjustment/control, convenient in implementation, properly camouflaged or economical for determining the location of events of different nature at different areas. Thus, several systems would be required to distinguish between perturbations, caused, for example, by events of different nature and/or perturbations that correspond to different environments encountered by a system installation.

Operational pipelines are subject to complex, highly non-linear temporal and spatial processes that usually make it difficult to differentiate between faults and stochastic system behaviors. This makes detecting failures/intrusions a challenging task, leading to integrating different types of data that is remotely captured from several sources, such as proposed fiber-optic system, as well as pressure transient signals and flow (velocity) information. The various types of (high frequency) data can be time synchronized. There is a need for a system capable of detecting small problems that might be precursors of catastrophic bursts, also enabling prompt detection and localization of larger leaks and malfunctioning equipment such as valves.

There is also a need for a technology to be used in earthquake continuous monitoring/early warning system. For example, when the system has detected a wave (P-wave-representing the warning of a future imminent major earthquake), the visual and acoustic quake alarm can be started.

SUMMARY OF THE INVENTION

A system and method for structure monitoring and locating a disturbance event is disclosed. The system includes a compact transceiver chip sending optical signals in three optical fibers that encompass the monitored structure appropriately. The fiber arrangement has different densities in different parts of the monitored structure, such as, for example, critical places in the structure may have a larger number of fiber loops surrounding them. All fibers transmit signals in both directions: from the transceiver to a returning point and back. A set of two detectors registers the returning signals, and the time delay between those signals is calculated using a digital signal processing (DSP) unit, this time delay is indicative of the disturbance event location. Polarization states of the returning signals are controlled by the transceiver's built-in controllers. The event location is determined with different sensitivity in different parts of the monitored structure depending on the density of fibers at different locations.

In the case of pipeline monitoring it is proposed to use a spiral fiber winding. The first and the second fibers are wound in one direction (they have the same optical path), while the third fiber is wound in the opposite direction. The density of windings is different in different structure elements providing required sensitivity in these areas.

In one embodiment the first and the second fiber are placed in one cable, which is shaped as a series of loops forming a chain-like structure with each loop characterized by its waveguide length, loop perimeter shape, and number of windings.

In the preferred embodiment the transceiver formed as an integrated component, including an input waveguide receiving light from the light source, a splitter which splits the input waveguide into a first and a second waveguides, the first waveguide providing input for the first light beam into the first fiber, and the second waveguide providing inputs for the second light beam into the second fiber and the third light beam into the third fiber; a first coupler splitting the second waveguide into a third and fourth waveguides; the third waveguide being connected to the second fiber and the fourth waveguide being connected to the third fiber; a second coupler providing a first detector waveguide being connected to the first waveguide; the first detector waveguide leading the fourth signal to the first photo-detector; and a third coupler providing a second detector waveguide being connected to the second waveguide, the second detector waveguide receiving the fifth and the sixth signals combined and leading it to the second photo-detector.

Yet another object of the present invention is a method for a structure monitoring and locating a disturbance event. It includes the following steps: sending three optical signals via optical fibers from a transceiver to a returning point and then back; receiving the return signal by a set of photodetectors, measuring a time delay between the signals and locating the disturbance event. The system sensitivity to the disturbance event is different for different parts of the monitored structure. In the preferred embodiment the transceiver formed as an integrated component.

Another object of the present invention is an optical sensor for a disturbance event location. It includes a transceiver sending optical signals in a first, a second and a third fiber towards a returning point and back. The first and the second fiber are combined in one cable with clockwise windings, and the third fiber being placed in a second cable having counter-clockwise windings. The returned signals are detected by a set of photodiodes; a time delay between the signals is measured. A DSP unit determines the disturbance event location based on the time delay. The number of windings in each segment of the monitored structure is chosen to achieve a required sensitivity at the disturbance location. In one embodiment, the sensor may include a chain-like sequence with the multiple coiled segments each having different shapes and/or the number of windings.

DETAILED DESCRIPTION OF THE INVENTION

The present invention will now be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The system is designed for structure monitoring and disturbance detection and locating. The sensitivity to the potential perturbation can vary along the fiber cable, depending on the requirements within a particular area. Thus, the sensitivity of the system at particular area can be optimized in terms of local structural layout, depend on how often the perturbation occurs (event probability) or reflect the different types of event within different areas (different types of damage, intrusions, etc.). The optimal sensitivity of the system is based on combination of the foregoing factors that correspond to the each particular monitoring area.

In the preferred system configuration, the fiber link is integrated into the area with no visible physical barrier present. The system is suitable either for an underground arrangement or integrated into the structure, providing a security (fence) and/or damage monitoring to a required area. The technology is optimized for detection and location of an event, caused by perturbation due to external intrusion or external/internal damage.

The fence includes the optical fiber cables with the counter-propagating optical signals having certain characteristics that can be modified or affected by an external parameter caused by an event. The applied strain, vibration, acoustic emission, temperature transient, can cause fiber elongation, change in index of refraction, birefringence, or a combination that, in turn, can modify the counter-propagating optical signals and indicate an event.

Figure 1:
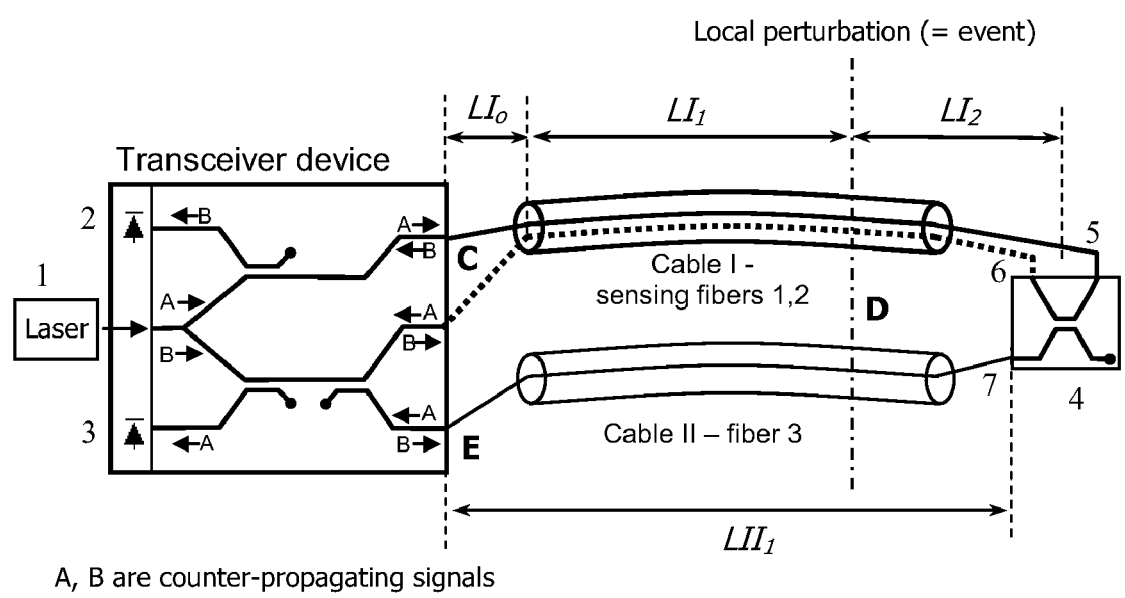
FIG. 1 shows a conceptual view of the distributed interferometric sensing system with counter-propagating signals.

Continuous-wave optical signals are launched from a single light source 1, FIG. 1, into the waveguide and simultaneously detected by two separate photo-detectors 2 and 3. (Pulsing of the optical signal may be employed in some arrangements). The receiver detects the affected counter-propagating optical signals and determines the time delay or difference between the modified counter-propagating optical signals in order to determine the location of the event.

A returning point 4 provides for mixing and reversing the sent signals. It operates in both directions and has three input-outputs 5, 6, and 7 connected to the first, second and third fibers respectively.

Any mentioned sensed parameter that alters the fiber will affect both counter-propagating signals in a similar fashion. However, each affected counter-propagating signals continues traveling the respective remaining portion of the waveguide loop to their respective photo-detector. This will produce a resultant time delay or time difference between the detected signals. The time delay is directly proportional to the location of the sensed event along the waveguide length. Therefore, if the time delay or difference is detected and measured, the location of the event can be determined, quantified and identified.

The receiver detects the interference pattern. Upon the disturbance a parameter of light passing through one of the waveguides is altered with respect to the same parameter of the light passing through the other waveguide, and thereby it changes the interference pattern detected by the detector.

An indication of the disturbance is provided by detecting the change in the interference pattern due to the change in the waveguide parameter, where the light passing through one of the output waveguide is altered with respect to another.

In addition, in certain system configurations a non-sensitive fiber optic delay line can be integrated at either or both ends in order to add additional delay between the transmitted counter-propagating signals.

The system does not require signal averaging, and it determines the location of events via the time delay measurement between counter-propagating optical signals affected by the same disturbance.

Schematic set-up of the system, utilizing a Mach-Zehnder (MZ) interferometric sensing technique is shown in the FIG. 1.

This generalized embodiment illustrates the distributed sensing element, having Cable I and Cable II as the MZ interferometer arms that include some arbitrary lengths of 'insensitive' lengths $LI_o$ and $LII_1$. While not playing an active part in perturbation detection, these fiber segments provide an additional optical delay between the transmitted counter-propagating signals. This can substantially facilitate the practical implementation of the system. The 'active' part of the fiber sensor consists of segment $LI_1$ and $LI_2$, see FIG. 1. The perturbation can occur at the point D, anywhere along this active part of the sensor, producing two identical perturbation of the signal, propagating in opposite directions: from D to C and from D to E, as shown in FIG. 1. The total optical fiber link with total distance:

$$L = LI_o + LI_1 + LI_2 + LII \qquad (1)$$

The goal is to detect and locate a disturbance at point D, anywhere along the sensitive section of the fiber link. The measurable parameter is the $\Delta t$—the difference in time of arrival of each of these signals at points C and E, measured by (balanced) photodiodes at the transceiver chip, see FIG. 1.

$$\Delta t = N \frac{(LI_2 + LII) - (LI_1 + LI_0)}{c} = N \frac{L - 2(LI_0 + LI_1)}{c} \qquad (2)$$

where c is the speed of light in a vacuum and N is the effective refractive index of the optical fiber (waveguide).

The perturbation location from one side of the link (point C) is given by:

$$P_C = LI_0 + LI_1 = \frac{L}{2} - \frac{\Delta t c}{2N} \qquad (3)$$

The same perturbation location from the opposite side of the link (point E) is given by:

$$P_E = LII + LI_{12} = \frac{L}{2} + \frac{\Delta t c}{2N} \qquad (3a)$$

This result illustrates that only knowledge of the total fiber link length L is required, and not the respective lengths of the various sensitive and insensitive fiber segments in the system.

The total fiber link may include multiple cable segments having various, generally different, patterns of the fiber arrangements along the link. The information about the total length and individual segments can be easily obtained at the design and installation stages of a system as well as by use of an OTDR method after installation.

The two (balanced) detectors detect the corresponded counter-propagating signals traveling in respective directions. Once the total length is known and the time delay $\Delta t$ is measured by the system, the location of the sensed event can be readily determined by equation (3). The time difference between the two modified counter-propagating signals will determine the disturbance location. Alternatively, a single detector could be utilized to detect both of the counter-propagating signals so that the signal detector has a synchronized reference to determine the time difference and the length along the cables where a disturbance has occurred.

Figure 2:
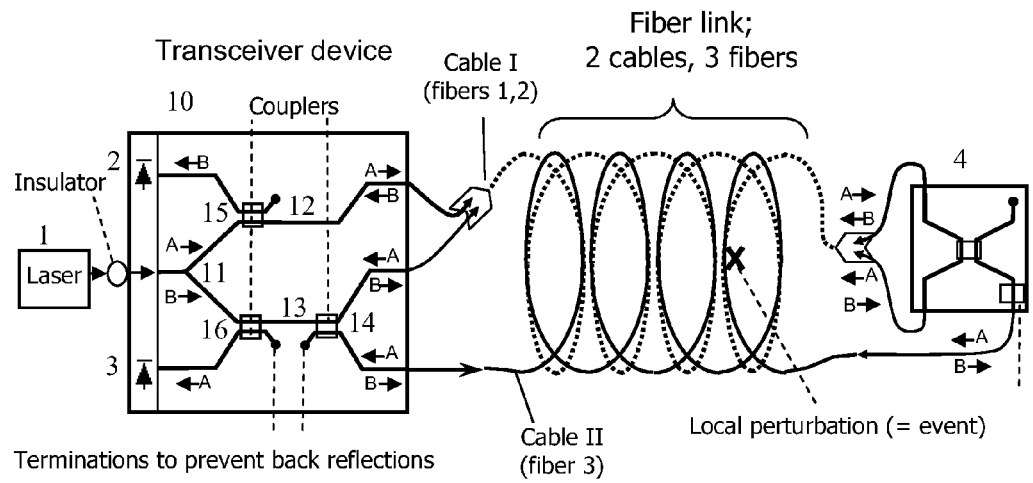
FIG. 2 illustrates one possible pattern for cables arrangement in the sensing fiber link.

The first embodiment of the proposed system is shown in FIG. 2. The first and second waveguides can share the same cable while a separate second cable utilizes only one (third) waveguide. The two cables have preferably symmetrical pattern.

These separate cables can be placed under the surface (e.g. carpet and such) or buried underground. Cable I and Cable II are arranged in a proposed configuration (pattern) with respect to one another, defining a perimeter region having a custom width that is optimized upon application. The width can be defined by particular structural element under observation (e.g. pipeline), or can be defined by a distance which is traversed by a person intruding into the area. For example, the sufficient width can be such that an intruder traveling in a walking or running motion would not step over the fence area. In this case, for maximum effect the cables should be laid in a shallow trench for the entire length of the sensitive zone.

The system can also be used for monitoring and detecting various soil displacements, for example the ones associated with the underground tunneling activity. In preferred configuration, the buried sensing cables are laid along the bottom of the trench, in a closely spaced proposed loop-based pattern that runs across the full width of the trench.

It is essential that the pattern of one cable is opposite to that of the other cable, in order to be out of phase. The cables may touch as they cross over or being overlapped. The maximum sensitivity can be optimized for the application.

In the preferred configuration, an integrated transceiver 10 is connected to the light source 1. The light is split by a splitter 11 into two beams travelling along the first 12 and the second 13 waveguides. A coupler 14 splits the second beam and directs it to the second and the third fiber. Couplers 15 and 16 (optionally tunable) are integrated in a single LN (LiNbO$_3$) chip, which also includes pair of balanced diodes 2 and 3. These couplers lead the returning signals to the photodetectors. The cables are terminated at either each end of the perimeter or at one end only if the perimeter is closed. The returning coupler 4 can also be LN integrated or, alternatively, made of fused silica fibers. The integrated configuration leads to a very compact, reliable and flexible system where the operating point can be easily adjusted by means of electro-optical and/or thermo-optical controls.

Optionally, the simplified version may be based on the terminating polished mirrors instead of a coupler, providing an intrusion alert without determination the event location in this case.

The protected area can be completely or partially enclosed by the perimeter to provide complete monitoring of the region of interest. Anybody attempting to gain access into the protected area will walk over the preferably hidden cables, and the weight of the intruder will apply a load to the two cables or, potentially, move the cables as the intruder walks over, under and/or along the cables. This will cause a change in parameter, such as a phase of the signal, which, in turn, changes the interference pattern when the modified signal recombines with the counter-propagating modified signal.

Similarly, a change in parameter, such as a phase of the signal, can be caused by damage to the structure along the monitored perimeter, such as, for example, pipeline or bridge, where the cables are installed.

The system can be integrated into a structure, such as fence, pipeline, bridge or building elements. The cables can be installed into existing site/layout, integrated into the monitored structure itself or buried underground by excavating a trench. The removed soil can be used to backfill the trench after laying the cables. Once installed, the cables do not require any particular care, such as maintaining very precise pattern uniformity.

All configurations have the advantage that the concealed cables are sensitive enough to detect even the slightest footfall, continuously and discretely, twenty-four hours a day for a very long period of time. Their performance is unaffected by changes in the local environment (rain, hail, temperature, electrical storms and magnetic loads). Noise and vibration effects from background traffic can be screened out. Washouts do not disable the system and can be repaired.

The advantage of the proposed system is that the fibers cannot be detected by metal detectors or emission measurements, since cables not require any metal components and do not emit electromagnetic radiation. The sensitivity of the detecting system and corresponded alarm level can be arranged to suit the application/operational requirements. The sensitivity of the system is weakly dependent on the fiber length up to several tens of kilometers without signal amplification. Signal amplification can be used for greater fiber length.

It is desirable to have a distributed sensing system where the sensitivity to the potential perturbation can vary along the cable, being adjusted to the actual system environment/application. In other words, the real system implementation might require a customized (optimized) system response to events that occur at different areas of the monitored system depending on, for example, different structure layouts, various perturbation probabilities within different areas, or different nature of perturbations within different areas.

Distributed Sensing

Figure 3:
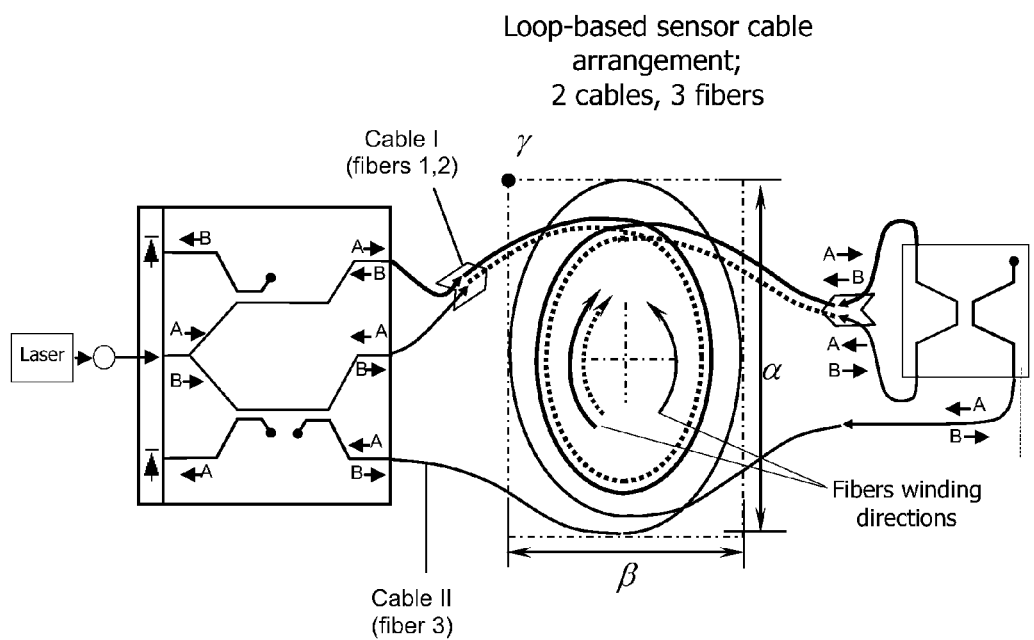
FIG. 3 illustrates a loop-based layout for the sensor.

Yet another loop-based layout for the interferometric fence structure that based on the three foregoing fibers is proposed. A single loop-element (period) of such fiber sensor is schematically shown in the FIG. 3. As it can be seen from the FIG. 3, each fiber has a defined winding direction with respect to other fibers.

Here the parameters of the fiber sensor, such as, for example, a loop shape $\alpha$ and $\beta$, as well as the number of windings within the loop $\gamma$ can be adjusted accordingly to a required application and optimal response R to particular perturbation Fp:

$$R(t)=R\{Fp(L,t),\alpha,\beta,\gamma\}, \quad (4)$$

where t is the time and L is the location along the cable.

Figure 4:
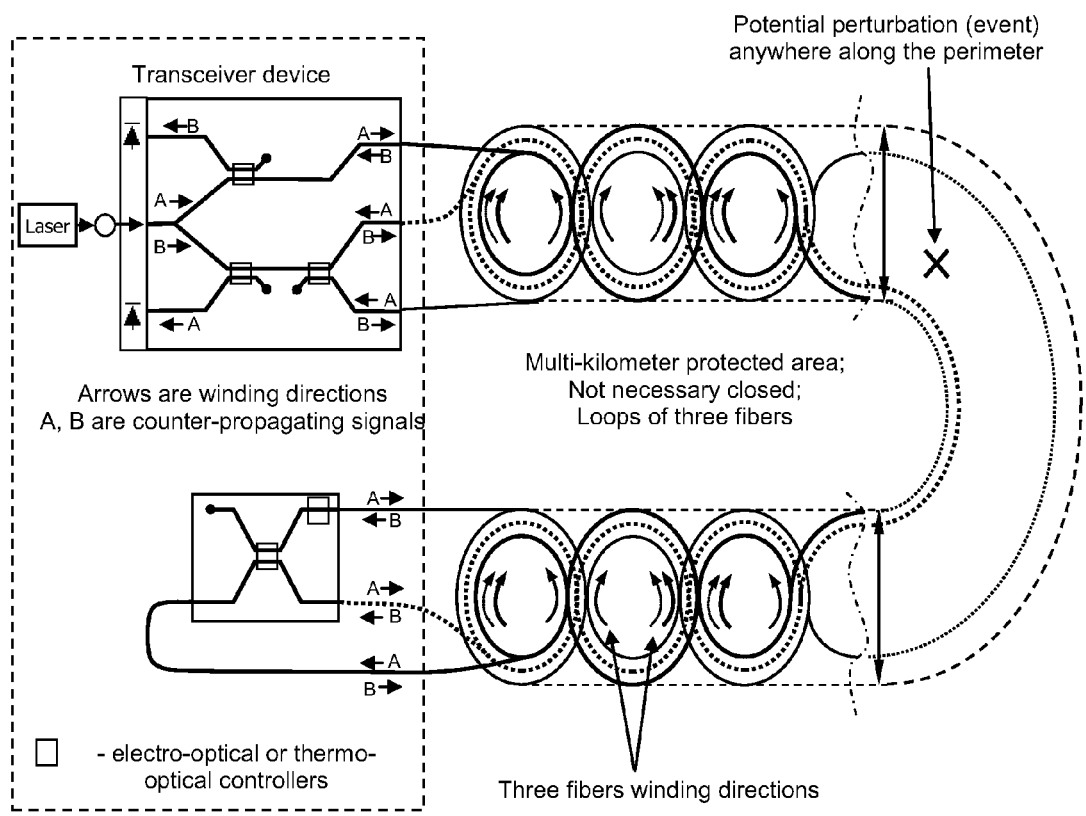
FIG. 4 shows a system embodiment with multiple loop segments along the sensing fiber link.

The approach can be further extended by using a 'chain' of loops of, generally, different $\alpha$, $\beta$ and $\gamma$. Thus, FIG. 4 illustrates the trench filled with such multiple loops, each made of the three interferometric fibers, respectively.

The sensitivity of the fence system will depend on amount of windings in each loop as well as on a number/shape of the loops, and can be improved at the expense of fence complexity and additional fiber cost.

Figure 5:
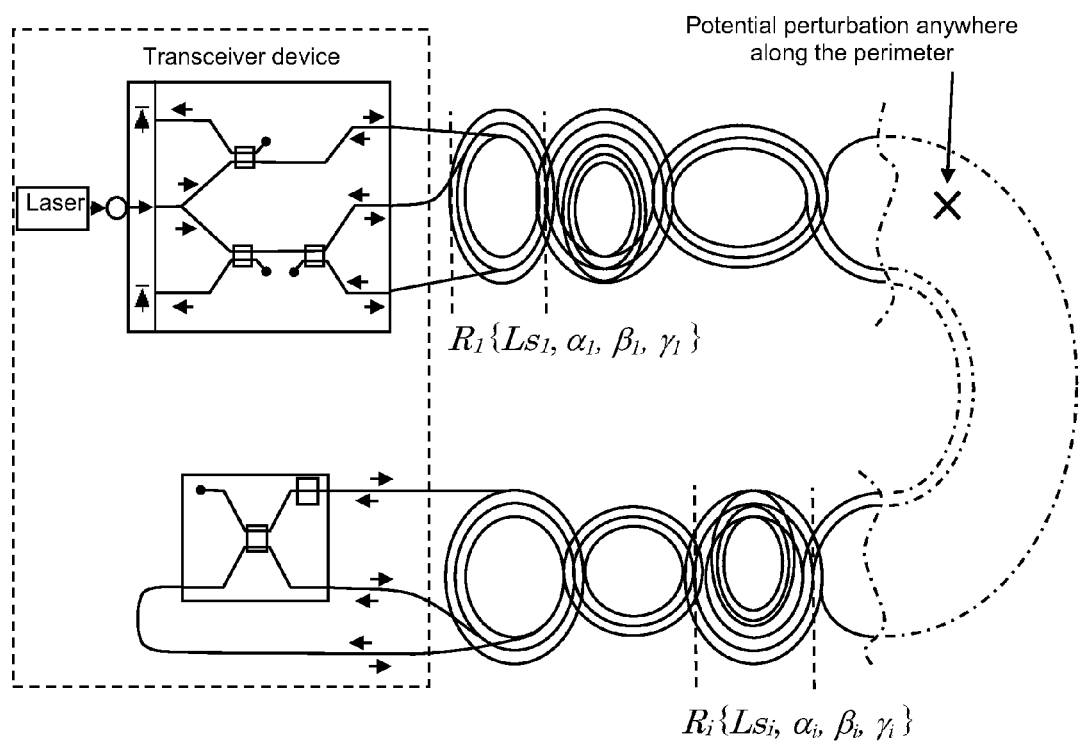
FIG. 5 illustrates a system embodiment with different loops layout along the fiber link. The sensor response to the perturbation at each section of the perimeter is different.

As mentioned, it is desirable to have a variable detection/location capability along the perimeter area of the system. It can be realized by varying the amount of cable installed at the specific location of the perimeter. Thus, an example of the system, where the different amount of cable associated with different area (sensitivity), is shown in FIG. 5. Here all parameters of the loops layout can vary along the perimeter L. In this case, optimal response $R_i$ to particular perturbation $Fp(L_i,t)$ will be a function of the particular configuration of the fiber at particular area of the perimeter $L_i$:

$$R_i(L_i,t)=R\{Fp(L_i,t),\alpha_i(L_i),\beta_i(L_i),\gamma_i(L_i)\} \quad (5)$$

Figure 6:
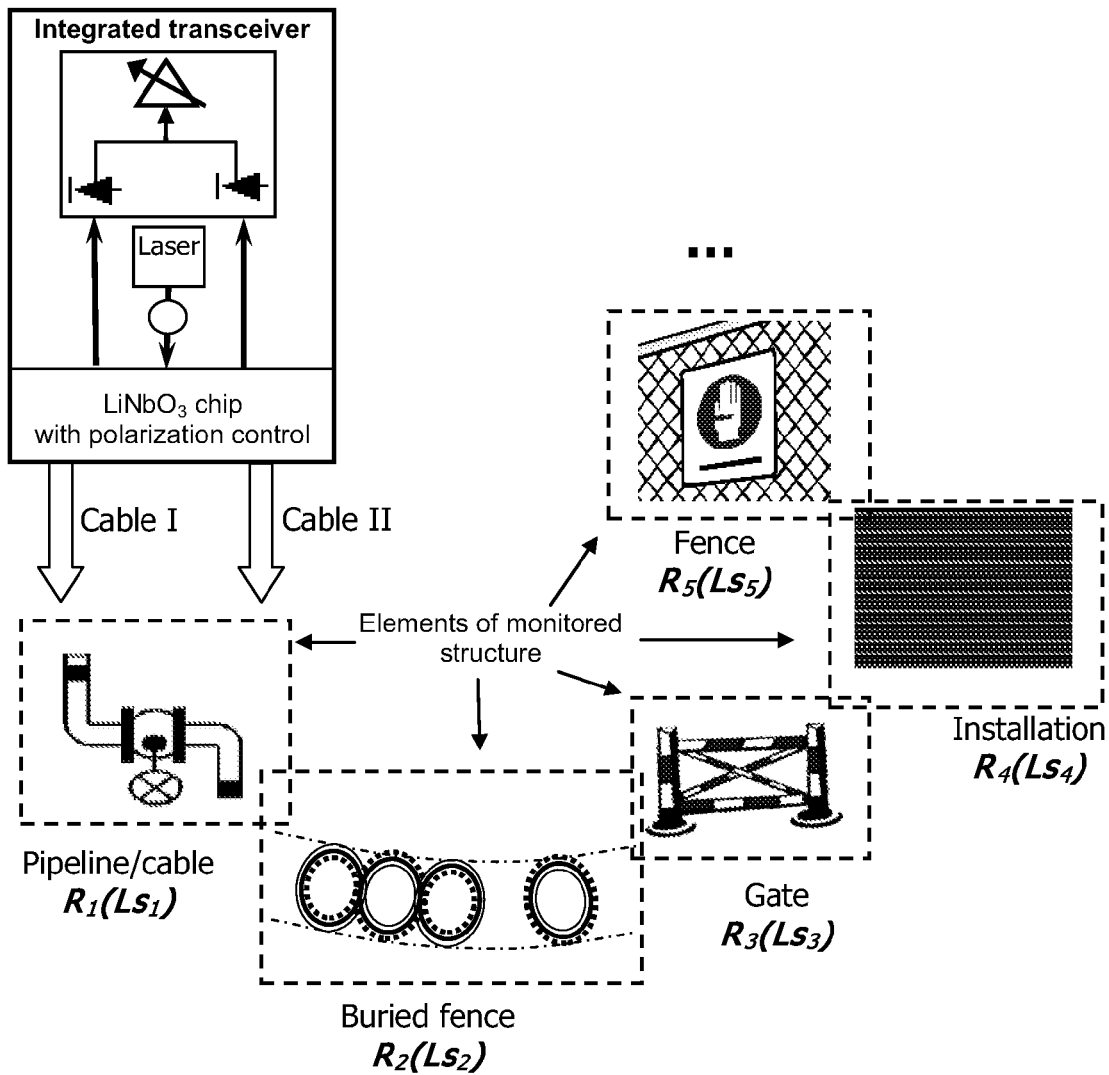
FIG. 6 shows a schematic example of a single sensing fiber link capable of detecting and locating various perturbations at different sections of the link. A system response is customized for each of the section along the perimeter.

FIG. 6 schematically illustrates the implementation of the single system for monitoring different types of objects, where different system response at different segments of the perimeter is required (distributed sensitivity).

Figure 7:
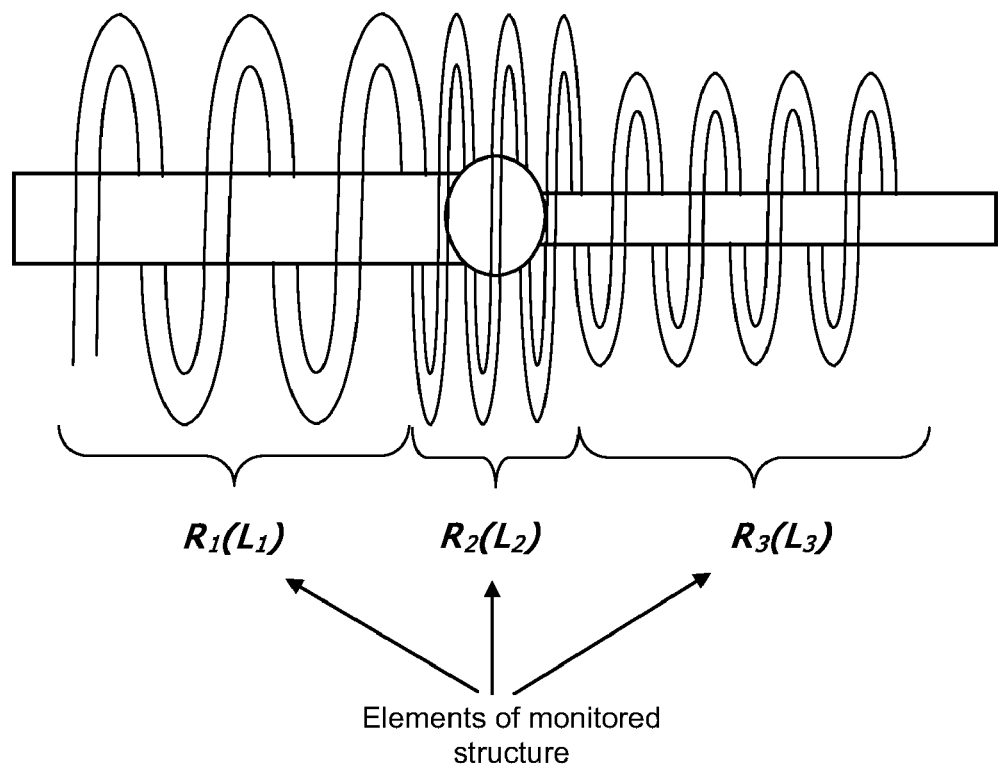
FIG. 7 shows spiral arrangement of fibers around a pipeline with different density of fibers in different elements of the monitored structure (pipe).

Alternatively, different responsivity can be assigned to different parts of the same object, as illustrated in FIG. 7 for a single cable, where the number of fiber loops and its shape is adjusted, accordingly to specific geometry of the monitored element or application requirements.

The detecting of a modified signal might not be sufficient to distinguish a perturbation of interest from other incidental perturbations. In a preferred embodiment the system involves the electronic analysis to decompose the detected signal and further use the training algorithms based on prerecorded database of various perturbations.

Prerecorded database of perturbations may include, but not limited to, different known patterns of predictable events such as simulated intrusions and simulated damages associated with different segments of the perimeter.

It is also often desirable in intrusion detection security systems to know when authorized persons have entered a specific area of the perimeter for legitimate purposes and to record their identity. In systems providing surveillance of spaces on campuses or within buildings, it is regularly necessary for authorized persons to enter monitored areas without setting off an alarm.

Alternatively, more than one described system can be arranged into a secured perimeter, separated by a certain distance.

The proposed invention is of special interest for pipeline monitoring. FIG. 7 shows one embodiment of the fiber arrangement in this case. U.S. Pat. No. 6,644,848 by Clayton et al. discloses a sensor winding around the pipe. In our invention two cables are winding around the pipe, in opposite directions. The loop density, shape and size may be different in different elements of the pipeline as shown in FIG. 7 for one cable.

The proposed technology can be used for the pipe-line monitoring including the distributed damage sensing, security monitoring or combination of both. Such fiber optic pipeline intrusion and leak-detection system can operate over large distances detecting, locating and classifying noises and vibrations in the vicinity of the cable, distinguishing among leaks, tampering, intrusions, digging, machinery and vehicles operating nearby. It can help in preventing illegal tapping, intrusions and leaks that cannot be detected by conventional flow metering.

Polarization Management

The remote disturbance might be any of various physical occurrences that affect the waveguide on a scale that is comparable to the wavelength of the light. Slightest instances of changing physical pressure, motion or vibration and the like can change light propagation conditions sufficiently in an optical fiber or similar waveguide, to produce an effect that might be discerned as a disturbance and used as a basis to localize the effect. Theoretically, when a disturbance affects both beams propagating over unequal path lengths to a detector, a phase variation should arise at the detector on one of the two beams first, after a propagation delay from the point of the disturbance. A difference between the two signals may persist between the time of reception of the first signal to arrive along the shorter path, until the time of reception of the second signal to arrive along the longer path. After the second signal arrives, the same phase variation that affected the first signal affects the second one, theoretically equally. An interference summing node is effectively a phase comparator. The time span is a function of the difference in distances from the detector to the disturbance along the two paths. From the time difference and information as to whether the phase difference leads or lags, the disturbance can be located to a point. This point can even be at the middle of the loop, with the zero indicative time-difference in such a case.

The polarization attributes of the counter-propagating signals have to be taken into account. Birefringence changes polarization alignment by inducing a phase difference between two orthogonal components of a light signal. Polarization phase shift variations arise in part because there are dynamically varying changes to the polarization states of the light signals between the signals as they are launched, versus the principal polarization axis of the interferometer at which the received signals can potentially interfere constructively or destructively. Thus, the difference varies as a function of the birefringent state of the fiber along the two counter-propagation paths and the change in polarization alignment can involve a phase difference of its own. The effect of polarization fading and polarization induced phase shift can be quite detrimental, leading to system failure if precautions are not taken.

Similarly to interferometric adjustment, the polarization aspect of the signal can be adjusted to provide an accurate location of the event. Ideally, the state of polarization for the two interfering beams should be adjusted to be substantially parallel to each other before the interference, to avoid the polarization-induced signal fading and induced phase shift. Accordingly, the intensity criteria can be used as an input to a feedback control for adjusting one or more polarization controllers to maximize the amplitude of the intensity signal, i.e., to achieve the greatest available span between maximum and minimum levels of constructive and destructive interference. In other words, the feedback controls to the polarization controller can be arranged to make the depth of modulation of the interference signal as large as possible.

At standby condition is assumed when the system is prepared or primed to detect a disturbance. To obtain a maximum value and maximum swing in intensity, two conditions are addressed, namely:

(a) the polarization orientations of the two beams are aligned, (b) the phase difference between the two beams is set to zero.

Similarly, in order to obtain a minimum value of intensity:

(a) the polarization of the two beams are aligned, (b) the phase difference between the two beams is $\pi$ radians.

At the standby condition, the polarization transformation functions of the two counter-propagating optical channels can be effectively balanced by active management of the polarization conditions. Thus, the polarization mismatch for the counter-propagating optical signals, as well as effective phase, will always be the same at the standby condition. As a result, the location of the disturbance can be localized more accurately since the lead/lag time used to calculate the location can be determined dependably and more accurately.

The received signals can be combined in a polarization insensitive way, by controlling the polarization state of the input beams. In this way, the time difference of the intensity response for the two counter-propagating optical signals can be correlated at the point of detection. The received signals are matched in a way that eliminates the interference signal intensity variations resulting from polarization conditions and thereby demonstrates the lead/lag time without carry forward errors and complications caused by polarization effects.

In the absence of a disturbance, the intensity of interfering beams theoretically should be more or less constant due to a stable degree of constructive and destructive phase cancellation, i.e., interference, of the two more or less constant signals.

In a single LN chip, electro-optically adjusted birefringence is not sufficient to achieve effective polarization transformation since mode-conversion between the orthogonal TE and TM components is also required. Efficient 100% electro-optical conversion can be achieved by utilizing an off-diagonal element of the electro-optical tensor to cause mixing between the orthogonal TE and TM modes (normally uncoupled). However, an electro-optical TE↔TM converter alone is also not capable of providing general polarization transformation.

Figure 8:
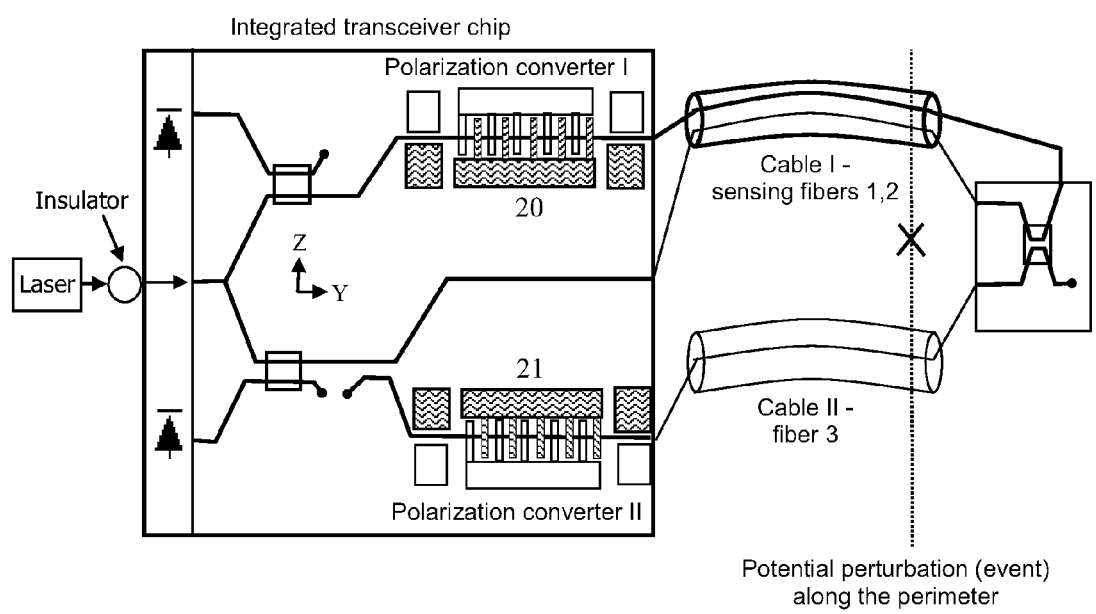
FIG. 8 shows a system embodiment with counter-propagating signals polarization management.

We propose to integrate into the system transceiver chip a (variable efficiency) polarization conversion scheme where the two electrical fields are applied alternately along the interaction region. For example, if electrical field applied parallel to the X direction of LN chip, an off-diagonal element in the dielectric permittivity tensor is induced via the electrooptic coefficient $r_{51}=28\times10^{12}$ m/V. In such scheme, short sections of birefringence tuning electrodes are periodically interleaved between short sections of TE↔TM mode converter electrodes, and a large number of sections are used in total. Although this arrangement may result in longer interaction lengths, it clearly permits independent control of TE↔TM mode conversion and birefringence tuning. In such orientation the TE and TM modes have significantly different propagation constants due to the large birefringence of LN. The propagation constant of the TM mode is mainly determined by the ordinary refractive index of LN, whereas the propagation constant of the TE mode is mainly determined by the extraordinary index. As shown in FIG. 8, the two polarization controllers 20 and 21, each based on 3-sections (cells), integrated into the LN X-cut, Y-propagation transceiver chip.

The middle section of converters I 20 and II 21 in the FIG. 8 has a constant electrode period $\Lambda$, and electro-optic TE↔TM mode conversion is obtained when a voltage Vc is applied to the mode converter electrodes. In this case, the conversion is most efficient at a wavelength $\lambda_0$ defined by the phase-match condition:

$$\Lambda=\lambda_0/|no-ne| \qquad (6)$$

Here, no and ne denote the effective phase indexes of the TE and TM modes and $\lambda_0$ is the vacuum wavelength, where mode converter operates with maximum conversion efficiency under chosen $\Lambda$. At other wavelengths, this would not be the case; the contributions of adjacent mode converter fingers add slightly out of phase, resulting in a reduced overall conversion efficiency. The optical bandwidth of mode conversion is determined by the total interaction length L, i.e. the 3 dB bandwidth (FWHM) is given by $$\Delta\lambda/\lambda_0=\Lambda/L=1/N, \qquad (7)$$

where N is the number of electrode periods.

Polarization controllers 20 and 21 are used to control polarization effects in the counter-propagating optical signals by establishing and maintaining polarization states of the interfering beams for each of the counter-propagating light signals that are amenable to interference of parallel polarization components of the respective beams. This can be accomplished using feedback control so as to cause a polarization controller to seek maximum peak to peak interference signal amplitude. This and other related polarization management techniques permit a processor coupled to the detector (and optionally coupled to provide the feedback signal to the polarization controller) efficiently, easily and accurately to calculate the location of the disturbance.

Polarization controllers 20 and 21 are readjusted such that the state of polarization of the light beams travel along cables are parallel to each other before they interfere with each other at the detector, for the clockwise and the counter-clockwise propagating light signals, respectively, see FIG. 8.

The proposed fiber sensor is preferably realized using integrated planar-wave technology, such as $LiNbO_3$ electro-optical circuit and includes built-in polarization control elements to dynamically address the variation of polarization states along the fiber sensor. By these means, the phase difference due to signals polarization misalignment can be managed (minimized), enabling an accurate detection/localizing of the perturbation (event).

Proposed polarization control elements are built into the same electro-optical chip, making them an inherent part of the compact transceiver chip. Using integrated electro-optical planar-wave technology enables effective adjustment of the counter-propagating signals by tuning coupling ratios of splitters and combiners, optical phase adjustments and polarization management. High integration of electro-optical components within the same chip/package leads to a very noise-proof, compact and cost-effective solution.

The proposed system can either be placed under the ground surface, making it invisible for a potential intruder, or integrated into the structure itself. The technology can also help in detecting tunnels deep under ground, and monitoring the burred fiber-cable for the telltale soil displacements associated with tunneling activity.

Another application of the proposed system is to utilize the fiber(s) within an (existing) telecommunication cable as the distributed sensor element to provide information related to a damage or intrusion anywhere along cable length. Such an arrangement would be most valuable for protection of the cable facilities of power or telephone companies against unauthorized intrusion or tampering. When deployed in this manner, the sensor can detect direct contact, mechanical pressure, or acoustic signals.

Distributed optical fiber sensing links disclosed in invention can be effectively implemented in a wide variety of applications. Without limitation, the field of use can include railroads, roads, walls, gates, and bridges maintenance, as well as pipeline infrastructure, construction, fences of various types, petrochemical/nuclear-power infrastructures; earthquake monitoring. Any application that requires the detection, measurement and locating of a particular disturbance along the particular section of the fiber link can benefit from the invention. The invention would offer lower cost, unprecedented versatility, improved operational and safety-related characteristics over existing technologies.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A system for monitoring a structure and for locating a position of a disturbance event, comprising:
    a transceiver producing a first, a second and a third optical signals entering a first, a second and a third optical fibers;
    the first, second and third fibers encompassing the monitored structure; the first, second and third fibers forming different density of fibers in different parts of the monitored structure; wherein the density is determined as a total length of all fibers within the structure element;

the first, second and third fibers having a returning point; the returning point being a coupler operating in both directions; the coupler having a first, a second, a third input-outputs; the first, second and third input-outputs being connected to the first, second and third fibers respectively;

the first, second and third signal becoming a fourth, a fifth and a sixth optical signals after passing the returning point;

the fourth, fifth and sixth optical signals propagating from the returning point towards the transceiver along the first, second and third fibers respectively; the first, second and third fibers being capable of having some characteristic of the first, second, third, fourth, fifth and sixth signals modified or affected by the disturbance event; and detector means for detecting the modified fourth, fifth and sixth optical signals and for determining a difference between the receiving times of the modified signals in order to locate the disturbance event, wherein the detection is being performed with different sensitivity in different parts of the monitored structure.

2. The system of claim 1, wherein the monitored structure is a pipeline, and the first, second and third fibers are wrapped around the pipe forming a spiral arrangement, and the first and the second fibers are wound in one direction, while the third fiber is wound in the opposite direction, and wherein the first and the second fibers have the same optical path.

3. The system of claim 1, further comprising the first and the second fibers forming a first cable and the third fiber forming a second cable, the first cable being shaped as a series of loops forming a chain-like structure each loop characterized by its waveguide length, loop perimeter shape, and number of windings.

4. The system of claim 3, wherein loops having noncircular shape.

5. The system of claim 3, wherein the fiber length, loop perimeter shape, and number of windings of each loop is optimized to provide a required sensitivity in different parts of the monitored structure.

6. The system of claim 5, wherein the monitored structure is a pipeline, the first and the second fibers forming a first cable wrapped around the pipe forming a spiral arrangement, and wherein the loop is one winding of the spiral.

7. The system of claim 6, wherein the number of windings is higher in welded edges of pipes and other critical parts of the pipeline.

8. The system of claim 1, wherein the detector means comprises: a first and a second photodetectors; the first photodetector receiving the fourth signal, and the second photodetector receiving combined the fifth and the sixth signals.

9. The system of claim 8, wherein signals from the first and the second photodetectors are processed in a digital processing unit (DSP) recovering information about the location of the disturbance event.

10. The system of claim 1, wherein a light source is launching light into the first, the second and the third fibers.

11. The system of claim 10, further comprising:
the transceiver formed as an integrated component, including an input waveguide receiving light from the light source,
a splitter which splits the input waveguide into a first and a second waveguides, the first waveguide providing input for the first light beam into the first fiber,
a first coupler splitting the second waveguide into a third and fourth waveguides; the third waveguide being connected to the second fiber and the fourth waveguide being connected to the third fiber;
a second coupler providing a first detector waveguide being connected to the first waveguide; the first detector waveguide leading the fourth signal to a first photodetector; and
a third coupler providing a second detector waveguide being connected to the second waveguide, the second detector waveguide receiving combined the fifth and the sixth signals and leading it to a second photodetector.

12. The system of claim 11, further comprising a first and a second polarization converters in the first and the fourth waveguides to align polarization states of the received signals.

13. A method for a structure monitoring and locating a disturbance event, comprising:
sending a first, a second and a third optical signals from a transceiver to a returning point; the first, second and third signals entering a first, a second and a third optical fibers; the first, second and third fibers encompassing the monitored structure; the first, second and third fibers forming different density of fibers in different parts of the monitored structure; wherein the density is determined as a total length of all fibers within an area under observation;
the returning point being a coupler operating in both directions; the coupler having a first, a second, a third input-outputs; the first, second and third input-outputs being connected to the first, second and third fibers respectively; the first, second and third signal becoming a fourth, a fifth and a sixth optical signals after passing the returning point; receiving the fourth, the fifth and the sixth optical signals by a detector means; determining a time delay between the fourth, the fifth and the sixth signal signals; and locating the disturbance event, wherein the system sensitivity to the disturbance event is different for different parts of the monitored structure.

14. The method of claim 13, further comprising
combining the first and the second fibers in one cable, which leads to the same value of a phase change in the light beams propagating in these fibers.

15. The method of claim 14, further comprising:
shaping the cable in a series of loops forming a chain-like structure each loop characterized by its waveguide length, loop perimeter shape and number of windings.

16. The method of claim 15, wherein the waveguide length, loop shape, and number of windings of each loop is optimized to provide a required sensitivity in the event detection and locating.

17. The method of claim 13, wherein
the transceiver formed as an integrated component, including an input waveguide receiving light from the light source;
a splitter which splits the input waveguide into a first and a second waveguides, the first waveguide providing input for the first light beam into the first fiber;
a first coupler splitting the second waveguide into a third and fourth waveguides; the third waveguide being connected to the second fiber and the fourth waveguide being connected to the third fiber;
a second coupler providing a first detector waveguide being connected to the first waveguide; the first detector waveguide leading the fourth signal to the first photodetector; and
a third coupler providing a second detector waveguide being connected to the second waveguide, the second detector waveguide receiving combined the fifth and the sixth signals and leading it to the second photodetector.

18. The method of claim 17, further comprising additionally improving the disturbance event sensitivity by aligning polarization states of the detected signal by placing a first and a second polarization converters in the first and the fourth waveguides respectively.

19. An optical sensor for a disturbance event location, comprising
- a first, a second and a third fiber receiving light from a transceiver; the first, the second and the third fibers being arranged in at least one segment having multiple fiber windings; the first and the second fibers being combined in a first cable having clockwise windings, and the third fiber being placed in a second cable having counter-clockwise windings;
- a first, a second and a third light beams in the first, the second and the third fibers being mixed in a coupler located at an output of the segment, the first, the second and the third fibers being connected to a first, a second and a third coupler inputs;
- a fourth, a fifth and a sixth beams travelling from the coupler to the receiver in the first, second and third fibers respectively;
- a first photodetector receiving a fourth beam, and a second receiver receiving combined fifth and sixth beams; and
- a digital signal processing (DSP) unit determining a disturbance location by calculating a difference between the signal at the photodetectors; wherein the number of windings is chosen to achieve a required sensitivity of the disturbance location.

20. The optical sensor of claim 19, further comprising multiple segments being connected in a chain-like sequence with the multiple segments having different shape and/or the number of windings.

* * * * *